Figure 3:
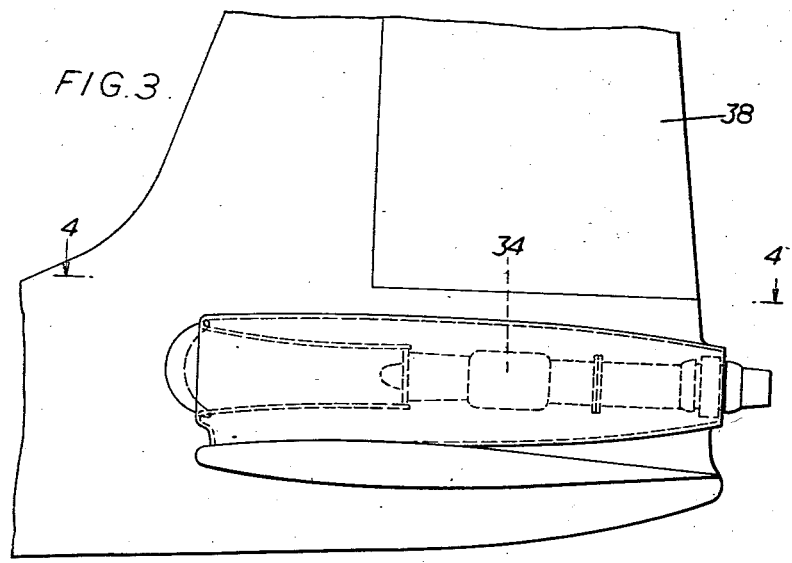

Nov. 20, 1962
P. A. WARD
3,064,419
JET PIPE NOZZLE
Filed May 4, 1959
2 Sheets-Sheet 1
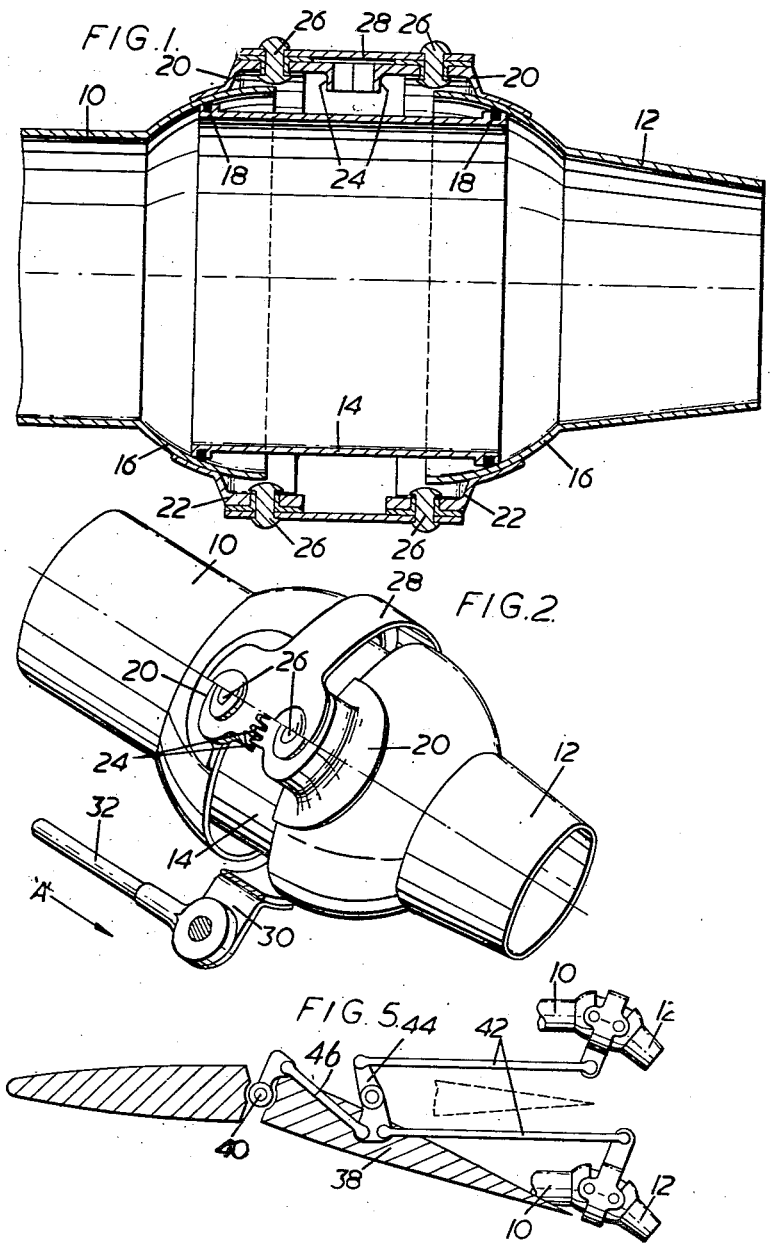
INVENTOR
Peter Arthur Ward
BY
Leech & Radue
ATTORNEYS Nov. 20, 1962 P. A. WARD 3,064,419
JET PIPE NOZZLE
Filed May 4, 1959 2 Sheets-Sheet 2

INVENTOR
Peter Arthur Ward
BY
Leech & Radue
ATTORNEYS

United States Patent Office 3,064,419
Patented Nov. 20, 1962

3,064,419
JET PIPE NOZZLE
Peter Arthur Ward, Littleover, Derby, England, assignor to Rolls-Royce Limited, Derby, England, a company of Great Britain
Filed May 4, 1959, Ser. No. 810,629
Claims priority, application Great Britain July 18, 1958
10 Claims. (Cl. 60—35.55)

This invention relates to a swivelling jet pipe nozzle for a jet propulsion engine. Such nozzles are provided so that a downstream portion of the jet pipe may be angularly adjustable relative to the remainder of the jet pipe, whereby the direction in which exhaust gases from the engine pass to atmosphere can be altered. It is the object of the present invention to provide an improved construction of swivelling nozzle.

According to the present invention there is provided a swivelling jet pipe nozzle for a jet propulsion engine comprising a fixed tubular nozzle portion which communicates in succession with at least a first and a second movable tubular nozzle portion, the movable portions being mounted for angular movements relative to the longtiudinal axis of the fixed portion and one of the movable portions being mounted for angular movements relative to the longitudinal axis of the other movable portion or portions of the nozzle.

Preferably nozzle adjustment means are provided for effecting angular movement of the first movable portion in a desired angular direction relative to the longitudinal axis of the fixed portion and for effecting angular movement of the other movable portion or portions in the same angular direction relative to the longitudinal axis of the first movable portion.

Preferably the nozzle adjustment means maintains the angle between the longitudinal axes of the fixed and first movable portions equal to the angle between the longitudinal axes of the first and second movable portions.

The nozzle adjustment means may comprise either gear means or links interconnecting the fixed portion with one of the movable portions.

Thus the nozzle adjustment means may comprise a toothed member on one movable portion which is engageable with a toothed member on the fixed portion, means being provided for maintaining the toothed members in engagement and for imparting movement to the movable portions, the said toothed members being adapted to produce equal angular movement of each of the movable portions relative to adjacent portions of the nozzle and to produce movement of each of the movable portions in the same direction.

Sealing means are preferably interposed between each adjacent fixed and movable portion or portions of the nozzle to ensure that substantially the whole of the exhaust gases from the engine pass through the movable portion or portions of the nozzle.

Figure 4:
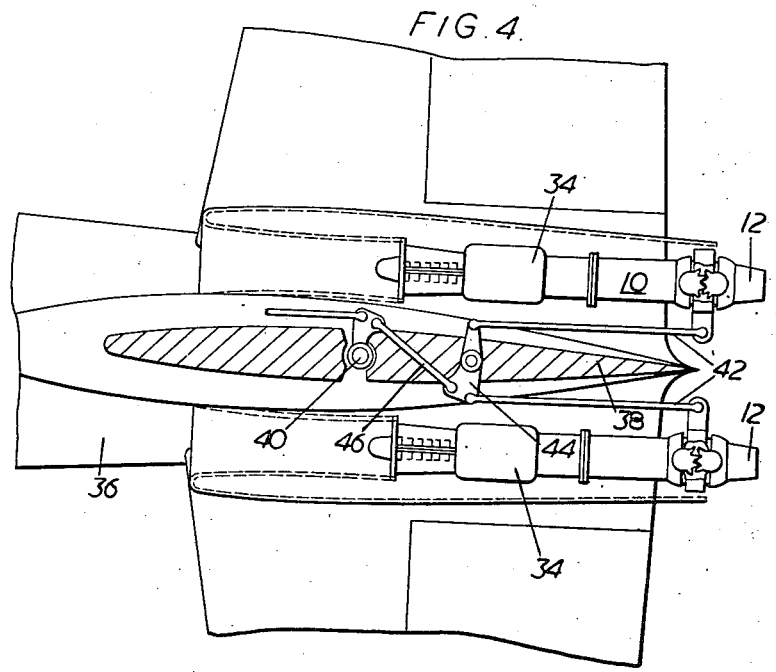

In order that the invention can be clearly understood, and readily carried into effect, a swivelling nozzle constructed in accordance with the invention will now be particularly described, by way of example only, with reference to the accompanying drawings in which:

FIGURE 1 is a sectional elevation of the nozzle,
FIGURE 2 is a part sectional perspective view of the nozzle,
FIGURE 3 is a view showing one practical application of the nozzle, in which it is arranged so as to be movable in sympathy with the rudder movements of an aircraft,
FIGURE 4 is a sectional view on line 4—4 in FIGURE 3, and
FIGURE 5 is a diagrammatic plan view similar to the view shown in FIGURE 4 of the drawings.

Referring to FIGURES 1 and 2 of the drawings, a swivelling jet pipe nozzle comprises a fixed portion 10, a movable exit portion 12 and a movable intermediate portion 14 which is supported between the portions 10 and 12. The adjacent ends of the portions 10 and 12 are each provided with a part spherical extension 16 in which the adjacent end of the intermediate portion 14 engages, and each end of the intermediate portion 14 is provided with a sealing ring 18 to give gas tight engagement between the ends of the portion 14 and the associated extension 16.

Each of the extensions 16 is provided with two diametrically opposed boss-like projections 20 and 22, the projections 20 having toothed quadrants 24 formed thereon, and being so arranged that the teeth of one quadrant 24 mesh with the teeth of the other quadrant 24. A pivot pin 26 is supported in each of the projection 20 and 22, and supported by the pivot pins 26 is a retaining strap 28 which extends circumferentially around the nozzle and is adapted to retain the nozzle assembly together.

In order to provide means for connecting the nozzle assembly to an actuating mechanism a tab 30 is attached to the outer periphery of the strap 28 and is arranged to project radially outwards from the nozzle assembly.

In the arrangement shown in FIGURE 2 of the drawings a rod 32 is connected to the tab 30, and, when the rod 32 is caused to move in the direction of the arrow "A," both of the nozzle portions 12 and 14 will pivot about the pins 26 supported by the projections 20 and 22 on the nozzle portion 10, whereby the portions 12 and 14 will be caused to take up an inclined position relative to the longitudinal axis of the fixed portion 10 of the nozzle.

Simultaneously with the above described movement the nozzle portion 12 is also caused to pivot about the pins 26 supported by the projections 20 and 22 carried on the nozzle portion 12 by the interengagement, and relative movement of the toothed quadrants 24 whereby the nozzle portion 12 is caused to take up a position in which its longitudinal axis is inclined relative to the longitudinal axis of the portion 14 of the nozzle.

In this particular construction the angles at which the longitudinal axes of the nozzle portions are inclined to each other are equal but it will be appreciated that the relationship of these angles can be varied by varying the gear ratios of the toothed quadrants 24.

In an alternative construction of nozzle in accordance with the invention, the toothed quadrants 24 are replaced by an arrangement of links, in which two diametrically opposed links are connected between pivot pins on the portions 10 and 12 of the nozzle and disposed diagonally of the longitudinal axis of the portion 10 of the nozzle.

Thus when the movable portions of the nozzle are caused to rotate about the pivot pin on the fixed portion of the nozzle, the longitudinal axes of the movable portions assume a position which is inclined to the longitudinal axis of the fixed portion and also in which they are inclined to each other.

FIGURES 3, 4 and 5 of the drawings show one practical application of a swivelling nozzle constructed in accordance with the invention, in which the nozzles are mounted on take-off booster engines 34 carried on the tail of an aircraft 36 beneath the rudder 38.

Each nozzle is connected to the rudder pivot shaft 40 by means of rods 42 which are connected between the tabs 30 and a pivot block 44 carried on the aircraft fuselage, whilst the pivot block itself is connected to the shaft 40 by means of a rod 46. Thus whenever the rudder 38 is moved the portions 12, 14 of the nozzles will be simultaneously moved in the same direction. Therefore if during take-off one of the main engines of the aircraft fails, then by suitably positioning the rudder the take-off boost developed by the engines 34 can be deflected to assist the rudder and maintain the aircraft on course.

It will be appreciated that the swivelling jet pipe nozzle of the present invention is particularly well suited for use on a vertical take-off aircraft such, for example, as that disclosed in my copending application Serial No. 813,903.

I claim:

1. A swivelling jet pipe nozzle for a jet propulsion engine comprising a fixed tubular nozzle portion, a first and a second movable tubular nozzle portion with which the fixed nozzle portion communicates in succession, the opposite ends of the first movable portion being mounted within and solely supported by the fixed portion and by the second movable portion respectively, means mounting the movable portions for angular movements relative to the longitudinal axis of the fixed portion, means mounting the second of the movable portions for angular movements relative to the longitudinal axis of the first movable portion of the nozzle and for lateral displacement relative to said longitudinal axis, the said means mounting said movable portions for said angular movements being constructed to prevent relative rotational movement between the portions about their longitudinal axes, and means for effecting the said angular movement of the second movable portion in respect to the first and said lateral displacement of the second portion relative to said longitudinal axis.

2. A swivelling jet pipe nozzle for a jet propulsion engine comprising a fixed tubular nozzle portion, a first and a second movable tubular nozzle portion with which the fixed nozzle portion communicates in succession, the opposite ends of the first movable portion being mounted within and solely supported by the fixed portion and by the second movable portion respectively, means mounting said movable portions for angular movements thereof relative to the longitudinal axis of the fixed portion and to each other, said mounting means being constructed to prevent relative rotational movement between the portions about their longitudinal axes, and nozzle adjustment means constructed for effecting simultaneous angular movement of the first movable portion in a predetermined angular direction relative to the longitudinal axis of the fixed portion and for simultaneously effecting equal angular movement of the second movable portion in the same angular direction relative to the longitudinal axis of the first movable portion.

3. A swivelling jet pipe nozzle for a jet propulsion engine comprising a fixed tubular nozzle portion having a flared downstream end, a first movable straight tubular nozzle portion and a second movable tubular nozzle portion having a flared upstream end, the fixed portion communicating in succession with said first and second portions, the opposite ends of the first movable portion being mounted within the flared ends of and supported by the fixed portion and by the second movable portion respectively, means mounting said movable portions for angular movements thereof relative to the longitudinal axis of the fixed portion and to each other, said mounting means being constructed to prevent relative rotational movement between the portions about their longitudinal axes, a toothed member on the second movable portion, a toothed member on the fixed portion, link means maintaining the toothed members in engagement with each other and for imparting movement to the movable portions, the said toothed members being arranged to produce equal angular movement of each of the movable portions relative to adjacent portions of the nozzle and to produce movement of each of the movable portions in the same direction, and a sealing means mounted on each end of the straight tubular section and arranged to engage said flared ends in all adjusted positions to provide substantially gas type connections between the pipe sections.

4. A swivelling jet pipe nozzle for a jet propulsion engine comprising a fixed tubular nozzle portion, a first and a second movable tubular nozzle portion, with which the fixed portion communicates in succession, the opposite ends of the first movable portion being mounted within and supported by the fixed portion and by the second movable portion respectively, means mounting said movable portions for angular movements thereof relative to the longitudinal axis of the fixed portion and to each other, said mounting means being constructed to prevent relative rotational movement between the portions about their longitudinal axis, a toothed member fixed on the second portion, a toothed member fixed on the fixed portion, said mounting means being arranged to maintain the toothed members in engagement with each other, means pivoting each of the toothed members to the engagement maintaining means, and means for effecting pivotal movement of the engagement maintaining means with respect to the fixed portion, the said toothed members producing equal angular movement of each of the movable portions relative to adjacent portions of the nozzle and producing movement of each of the movable portions in the same direction.

5. A swivelling jet pipe nozzle for a jet propulsion engine comprising a fixed tubular nozzle portion, a first and a second movable tubular nozzle portion with which the fixed portion communicates in succession, the opposite ends of the first movable portion being mounted within and supported by the fixed portion and by the second movable portion respectively, means mounting said movable portions for angular movements thereof relative to the longitudinal axis of the fixed portion and to each other, said mounting means being constructed to prevent relative rotational movement between the portions about their longitudinal axes, a toothed member fixed on one of the movable portions, a toothed member secured on the fixed portion, a strap forming said mounting means maintaining the toothed members in engagement with each other, each of the toothed members being pivoted to the said strap, said strap extending circumferentially around the nozzle, and means for effecting pivotal movement of the strap with respect to the fixed portion, the said toothed members producing equal angular movement of each of the movable portions relative to adjacent portions of the nozzle and producing movement of each of the movable portions in the same direction.

6. An aircraft having a jet propulsion engine, said engine comprising a swivelling jet pipe nozzle which comprises a fixed tubular nozzle portion, a first and a second movable tubular nozzle portion with which the fixed nozzle portion communicates in succession, the opposite ends of the first movable portion being mounted within and supported solely by the fixed portion and by the second movable portion respectively, means mounting the movable portions each for angular movement relative to the longitudinal axis of the fixed portion, means mounting one of the movable portions for angular movements relative to the longitudinal axis of the other movable portion of the nozzle, said means mounting said movable portions for said angular movements being constructed to prevent relative rotational movement between the portions about their longitudinal axes, said aircraft comprising a pivoted rudder, means adapted to move said rudder about its pivot, and linkage connecting said last mentioned means and said mounting means for the movable nozzle portions so that the latter moves in unison and in the same direction as said rudder.

7. A swivelling jet pipe nozzle for a jet propulsion engine comprising a fixed nozzle portion having a substantially hemispherical end section, a first and a second movable circular tubular nozzle portion with which the fixed nozzle portion communicates in succession, the said second movable nozzle portion having a substantially hemispherical end section, the opposite ends of the first movable portion being mounted within and supported solely by the substantially hemispherical end sections of said fixed portion of said second movable portion respectively, means mounting both the movable portions for pivotal movements about a first axis which passes through the centre of curvature of the substantially hemispherical end section of the fixed nozzle portion of which extends transversely of the longitudinal axis of the fixed portion, means mounting the second of the movable portions for pivotal movements about a second axis which passes through the centre of curvature of its substantially hemispherical end section and which is parallel to said first axis, the said means mounting said movable portions for said pivotal movements being constructed to prevent relative rotational movement between the portions about their longitudinal axes, and means for effecting the said pivotal movement of the second movable portion in respect to the first.

8. A swivelling jet pipe nozzle for a jet propulsion engine comprising a fixed nozzle portion having a substantially hemispherical end section, a first and a second movable circular tubular nozzle portion with which the fixed portion communicates in succession, the said second movable nozzle portion having a substantially hemispherical end section, the opposite ends of the first movable portion being mounted within and supported by the substantially hemispherical end sections of said fixed portion and said second movable portion respectively, means mounting both said movable portions for pivotal movements about a first axis which passes through the centre of curvature of the substantially hemispherical end section of the fixed nozzle portion and which extends transversely of the longitudinal axis of the fixed portion, said means also mounting said second movable portions for pivotal movements about a second axis which passes through the centre of curvature of its substantially hemispherical end section and which is parallel to said first axis, said mounting means being constructed to prevent relative rotational movement between the portions about their longitudinal axes, a toothed member secured to the second movable portion, a toothed member secured to the fixed portion, and link means maintaining the toothed members in engagement with each other and for imparting movement to the movable portions, the said toothed members being arranged to produce equal angular movement of each of the movable portions relative to adjacent portions of the nozzle and to produce movement of each of the movable portions in the same direction.

9. A swivelling jet pipe nozzle for a jet propulsion engine comprising a fixed nozzle portion having a substantially hemispherical end section, a first and a second movable circular tubular nozzle portion with which the fixed portion communicates in succession, the said second movable nozzle portion having a substantially hemispherical end section, the opposite ends of the first movable portion being mounted within and supported by the substantially hemispherical end sections of said fixed portion and said second movable portion respectively, means mounting said movable portions for annular movements thereof relative to the longitudinal axis of the fixed portion and to each other, said mounting means being constructed to prevent relative rotational movement between the portions about their longitudinal axes, a toothed member fixed on said second movable portion, a toothed member secured on the fixed portion, a strap forming said mounting means maintaining the toothed members in engagement with each other, each of the toothed members being pivoted to the said strap about an axis which passes through the center of curvature of the substantially hemispherical end section of the nozzle portion to which it is fixed and which extends transversely of the longitudinal axis of said fixed nozzle portion, said strap extending circumferentially around the nozzle, and means for effecting pivotal movement of the strap with respect to the fixed portion, the said toothed members producing equal angular movement of each of the movable portions relative to adjacent portions of the nozzle and producing movement of each of the movable portions in the same direction.

10. The swivelling jet pipe nozzle as defined in claim 9 in which the first movable nozzle portion is cyclindrical with ends cut off normal to its axis and each surrounded by a flexible packing to form a gas-tight movable joint within the adjacent hemispherical end section.

References Cited in the file of this patent

UNITED STATES PATENTS

| 1,014,664 | Myers | Jan. 16, 1912 |
| 1,165,021 | Price | Dec. 21, 1915 |
| 2,537,487 | Stone | Jan. 9, 1951 |
| 2,762,584 | Price | Sept. 11, 1956 |
| 2,951,660 | Giliberty | Sept. 6, 1960 |

FOREIGN PATENTS

| 743,874 | Great Britain | Jan. 25, 1956 |